(12) United States Patent
Haka

(10) Patent No.: US 6,422,966 B1
(45) Date of Patent: Jul. 23, 2002

(54) TOROIDAL TRANSMISSION WITH A STARTING CLUTCH

(75) Inventor: Raymond James Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/764,233

(22) Filed: Jan. 19, 2001

(51) Int. Cl.⁷ ............................................... F16H 37/02
(52) U.S. Cl. ...................................................... 475/216
(58) Field of Search ................................. 475/216, 214, 475/215, 207

(56) References Cited

U.S. PATENT DOCUMENTS

| | | | | |
|---|---|---|---|---|
| 4,416,168 A | * | 11/1983 | Arai et al. | 475/142 |
| 5,607,372 A | * | 3/1997 | Lohr | |
| 5,803,858 A | * | 9/1998 | Haka | 475/207 |
| 5,989,146 A | * | 11/1999 | Brown et al. | 180/247 |
| 6,056,661 A | * | 5/2000 | Schmidt | 475/207 |

* cited by examiner

*Primary Examiner*—Paul N. Dickson
*Assistant Examiner*—Melody M. Burch
(74) *Attorney, Agent, or Firm*—Leslie C. Hodges; Laura C. Hargitt

(57) ABSTRACT

A powertrain has an engine, a continuously variable transmission, (CVT) a starting mechanism, and a final drive gearing. The CVT includes a continuously variable unit (CVU) in the form of a full toroidal traction unit, a planetary gear arrangement, and a pair of mechanical clutches that are connectable with the starting mechanism through a synchronizing assembly. The planetary gearing arrangement provides both a forward and reverse ratio path and a torque splitting or summing function.

2 Claims, 1 Drawing Sheet

TOROIDAL TRANSMISSION WITH A STARTING CLUTCH

TECHNICAL FIELD

This invention relates to continuously variable transmission and more particularly to starting devices for toroidal transmissions.

BACKGROUND OF THE INVENTION

Toroidal transmissions are either half toroidal or full toroidal traction drives which typically utilize dual cavities for maximum efficiency. The dual cavity units have two input discs and two output discs each having a toroidal or partial toroidal shape. The output discs are typically located centrally between the input discs. Each input disk is engaged with a respective output disc through a plurality of traction rollers. The angle of the rollers is varied to change the drive ratio between the input and output discs. The dual cavity continuously variable unit (CVU) requires either a countershaft or a split torque arrangement to transmit power from the center (output) discs.

Half toroidal CVUs can use an input starting device, however, full toroidal CVU employ a geared neutral arrangement to effect vehicle launch. One example of a geared neutral arrangement is shown in U.S. Pat. No. 5,607,372 issued to Lohr on Mar. 4, 1997. This patent describes a half toroidal CVU having a coaxial split torque arrangement having a planetary carrier and two sun gear members. The carrier is the CVU input member and one of the sun gears is driven by the CVU output member. The other sun gear (output) is drivingly connected to a planetary gear assembly. By changing the roller angle in one direction, from neutral, a forward output is achieved and by changing the roller angle in the other direction, from neutral, a reverse output is achieved. This avoids the need for a starting device.

SUMMARY OF THE INVENTION

It is an object of the present invention to provide an improved continuously variable transmission (CVT) having a full toroidal CVU and an output starting clutch.

In one aspect of the present invention, a split torque planetary gear set is combined with a full toroidal CVU to provide a forward variable ratio range and a reverse fixed ratio. In another aspect of the present invention, the CVU has input members directly driven by a prime mover and the planetary gear set has a planet carrier member driven by the prime mover and a sun gear member driven by the output member of the CVU. In another aspect of the present invention, the planetary gear set has two ring gear members that rotate in opposite directions (relative to each other) when the CVU is set at a maximum underdrive ratio.

In yet another aspect of the present invention, a selectively operable mechanical clutch is disposed between the ring gear members and a selectively engageable starting clutch to provide a forward output and a reverse output from the CVU to the starting clutch. In still another aspect of the present invention, the ratio of the sun gear member to one ring gear member establishes a first directional output between the prime mover and a transmission output shaft driven by the starting clutch, and the ratio between the sun gear member and the other ring gear member establishes a second directional output, opposite the first directional output, between the prime mover and the transmission output shaft.

In a further aspect of the present invention, the CVU ratio remains constant during reverse operation and is varied during forward operation. In a yet further aspect of the present invention, the CVU is maintained at a maximum underdrive ratio during reverse operation and varied between the maximum underdrive ratio and a maximum overdrive ratio during forward operation. In a still further aspect of the present invention, the vehicle speed in forward operation is changed by either or both CVU ratio and prime mover speed, and the vehicle speed in reverse operation is changed by prime mover speed only. In a yet still further aspect of the present invention, the starting clutch is engaged to launch the vehicle in both the forward and the reverse directions.

This invention uses a CVU and a coaxial planetary gear set with a "split torque arrangement". A first ring gear member to sun gear member ratio is selected to provide the desired maximum overdrive ratio in the backwards direction (opposite engine rotation) of the CVU. This will increase the transmission overall ratio to approximately twice the CVU overall ratio, which will greatly improve the ability of the starting clutch to launch the vehicle at maximum underdrive. Selecting a backwards output direction of rotation, for forward drive operation, allows a design with minimum content and higher efficiency than the forward output designs. Reverse is achieved by adding a second ring gear member to provide a speed ratio equal in magnitude (with opposite direction) to the lowest forward CVT speed ratio. When the torque is output through the second ring gear member, the transmission could be used as a geared neutral CVT, however, the torque capacity and efficiency will be lower than the path provided by the first ring member.

The backward transmission output shaft rotation requires a "backwards" hypoid to provide a forward vehicle direction of travel. The hypoid gears used on the front axle of today's four wheel drive vehicles are generally designed to produce maximum efficiency with the opposite "prop shaft" rotation. Therefore, placing a "front" hypoid in the rear will provide the correct gear geometry for maximum efficiency with reverse prop shaft rotation; however, the wheel direction of rotation will not be correct. The front hypoid will need to be rotated 180 degrees about the prop shaft (i.e. installed upside down) to provide the correct wheel direction of rotation.

The proposed gear arrangement minimizes spin losses by using a manual transmission type dog clutch (with synchronizers) to eliminate the cost and spin losses of a second starting clutch. The synchronizers will only have to accelerate the inertia of the inner clutch plates and hub when shifting between forward and reverse. This inertia is significantly lower than the inertia of the driven disk and input shaft of a conventional manual transmission. The synchronizer can be activated by a conventional mechanical mechanism that is attached to the PRNDL lever, not shown, for minimum cost, or it can be activated hydraulically by any of the well-known electro-hydraulic control systems.

DESCRIPTION OF AN EXEMPLARY EMBODIMENT

Figure 1:
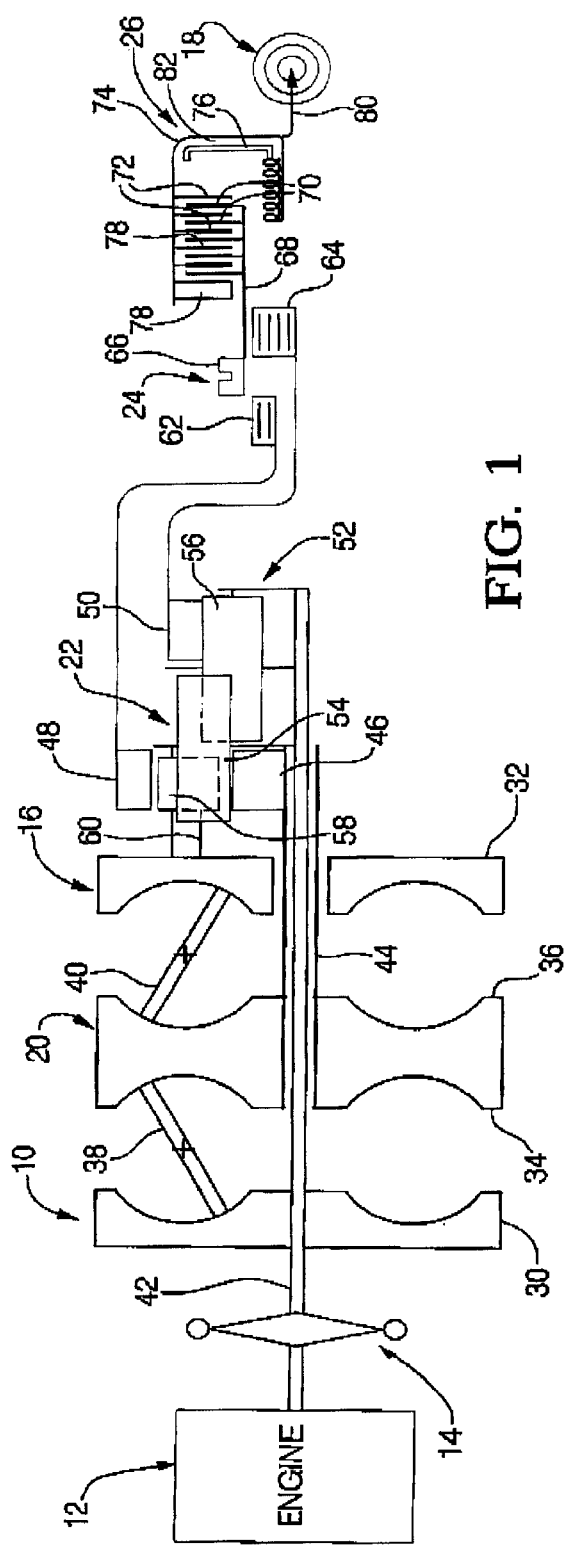
FIG. 1 is a schematic representation of a powertrain having a transmission incorporating the present invention.

A powertrain 10 has a conventional internal combustion engine 12, a spring vibration damper 14, a continuously variable transmission (CVT) 16, and a final drive gearing mechanism 18. The engine 12 is a throttle controlled device that operates within a speed range in a conventional manner. The spring damper 14 is a conventional device that effectively eliminates or significantly reduces the torsional impulses of the engine 12 to prevent any noticeable vibrations at an input shaft 42. The final drive gearing mechanism 18 is a conventional gear mechanism. The CVT 16 includes a full toroidal continuously variable unit (CVU) or traction drive mechanism 20, a planetary gear arrangement 22, a selectively operable mechanical clutch 24 and a selectively engageable fluid operated friction clutch 26.

The CVU 16 has two input members 30 and 32, two output members 34 and 36, and a plurality of equiangularly spaced traction rollers 38 and 40. The rollers 38 are maintained in rolling contact with toroidal surfaces on the input member 30 and the output member 34. The traction rollers 40 are maintained in rolling contact with the input member 32 and the output member 36. This type of CVU is well-known. The angle of the traction rollers relative to the toroidal center of the torus formed by the input member 30 and output member 34 and the torus formed by the input member 32 and the output member 36 determines the drive ratio between the input shaft 42, connected between the damper 14 and the input members 30, 32 and a CVU output shaft 44 connected with the output members 34, 36. The output members 34, 36 are secured together or otherwise formed integrally.

The planetary gear set 22 includes a sun gear member 46, a pair of ring gear members 48, 50 and a planet carrier assembly member 52. The planet carrier assembly member 52 has a carrier 60 on which is rotatably supported a plurality of pinion gear members 54, 56, and 58. Additionally, the pinion gear members 54 mesh with the sun gear member 46, the pinion gear members 56, and the pinion gear members 58. The pinion gear members 56 mesh with the ring gear member 50 and the pinion gear members 58 mesh with the ring gear member 48. The intermeshing pinion gear members 54, 56, and 58 are arranged in equi-angularly spaced groups of three or four in a well-known manner.

The carrier 60 is continuously connected for common rotation with the input CVT shaft 42 and the input members 30 and 32. The sun gear member 46 is continuously connected for common rotation with the CVU output shaft 44. The ring gear member 48 is continuously connected for common rotation with a reverse input member 62 of the mechanical clutch 24 and the ring gear member 50 is continuously connected for common rotation with a forward input member 64 of the mechanical clutch 24. The mechanical clutch 24 has a conventional manual transmission type dog clutch and synchronizer assembly or clutch mechanism 66 that is connected for common rotation with a clutch input member 68 of the friction clutch 26. As is well-known, the synchronizer assembly will permit the connection of either the reverse input member 62 or the forward input member 64 with the clutch input member 68.

The friction clutch 26 includes the input member 68, a first plurality of friction members 70, a second plurality of friction members 72, a hub 74, an apply piston 76 and a backup plate 78. The friction members 70 are splined to the clutch input member 68. The friction members 72 and the backup plate 78 are splined to the hub 74. The apply piston 76 is slidably disposed in the hub 74. The hub 74 is drivingly connected with a transmission output shaft 80 that is connected with the final drive gearing 18. The piston 76 and the hub 74 cooperate to form an apply chamber 82 which, when pressurized will cause the piston to enforce frictional engagement of the friction members 70 and 72 to establish a drive relation between the clutch input member 68 and the transmission output shaft 80 and therefore between the engine 12 and the final drive gearing 18. The planetary gearing 22 provides both the split torque connection and the speed ratio between the input shaft 42, the CVU 20 and the output shaft clutch input member 68. The friction clutch 26 provides the starting or launch function for the vehicle, not shown, in which the powertrain 10 is incorporated.

During operation, the carrier 60 and the input members 30 and 32 are driven forwardly (engine output direction) continuously by the engine 12. The sun gear member 46 is driven backwardly (opposite engine direction). For example, the ratio of the number of teeth on the ring gear member 48 and the sun gear member 46 is 1.650 and the ratio of the number of teeth on the ring gear member 50 to the sun gear member 48 is 1.214. The maximum underdrive speed ratio (output speed/input speed) of the CVU 20 is 0.40 and the maximum overdrive speed ratio is 2.40. At the maximum underdrive setting, the ring gear member 50 will rotate opposite the sun gear member 46 to provide a reverse drive ratio at the member 62 at a value of 0.15. Throughout the ratio spectrum of the CVU 20, the ring gear member 20 and the member 64 will rotate opposite the sun gear member 46 in a range of values between 0.15(underdrive) and 1.80 (overdrive). With the clutch 26 disengaged, the output shaft 80 will be disconnected from engine power. To launch the vehicle in either forward or reverse, the clutch 26 is engaged in a controlled manner by a conventional clutch engagement system that generally includes either an electronic control or a manual control.

Figure 2:
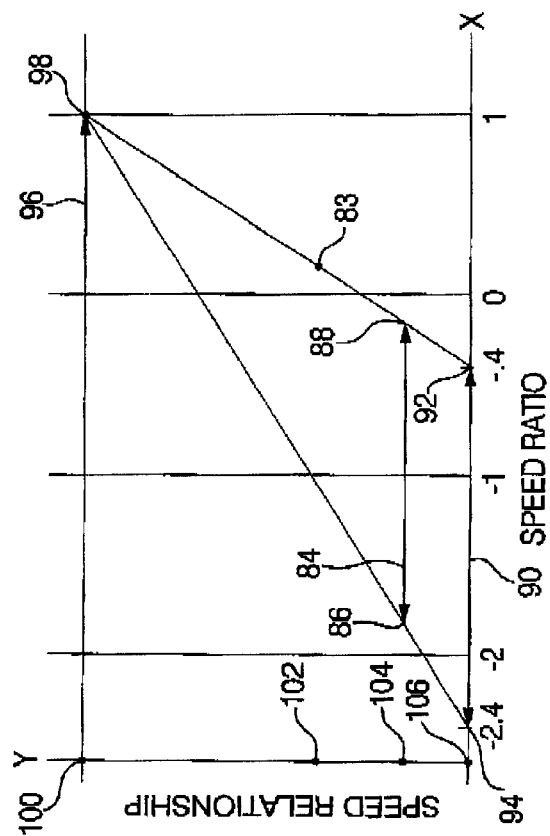
FIG. 2 is a speed ratio plot of a CVT incorporating the present invention.

The ratio of the CVU 20 is controlled by a conventional electronic control that includes a conventional programmable digital computer and a plurality of input signals such as speed, ratio set, ratio desired, throttle setting, and drive condition selected. When the reverse drive is selected by the operator, the CVU 20 will be set at the maximum underdrive condition and remain at that setting throughout the entire engine speed range as shown at point 83 of the speed plot in FIG. 2. When the operator selects the forward drive condition, the ratio of the CVU 20 will also be set at the maximum underdrive condition. However, when the operator actuates the throttle, either the CVU 20 ratio can change or the engine speed can change or both can change. The overall ratio of the CVT 16 will operate along the line 84 between the points 86 and 88 as shown in FIG. 2. The output of the CVU 20 is controlled along the line 90 between the points 92 and 94 of the speed plot in FIG. 2 and with the present embodiment the input/output ratio varies from –0.40 to –2.40. The mechanical input to the CVU 20 is represented by the vector 96 and has an end point 98 which is unity or +1.0. The "Y" axis of the plot represents the speed relationship between the members of the planetary gear set 22, and the "X" axis represents the ratio values of the members of the planetary gear set 22. The point 100 represents the carrier assembly member 52, the point 102 represents the ring gear member 48, the point 104 represents the ring gear member 50, and the point 106 represents the sun gear member 46. The distances along the "Y" axis are determined by the tooth ratios of the ring gear members to the sun gear member.

What is claimed is:

1. A powertrain including a continuously variable transmission comprising:

an engine;

a transmission input shaft continuously connected with said engine;

a transmission output shaft;

a continuously variable unit having spaced input members, adjacent output members intermediate said input members and cooperating therewith to form a pair of tori, a plurality of traction rollers in each tori frictionally engaging respective ones of said input and output members, said input members being continuously drivingly connected with said transmission input shaft;

a planetary gear arrangement having a planet carrier assembly member continuously connected with said transmission input shaft and said input members, a sun gear member operatively connected with said planet carrier assembly member and continuously connected with said output members, a first ring gear member operatively connected with said planet carrier assembly member, and a second ring gear member operatively connected with said planet carrier assembly member;

a selectively operable mechanical clutch mechanism individually connecting said ring gear members with a friction clutch input member; and a selectively engageable fluid operated friction clutch mechanism connecting said friction clutch input member with said transmission output shaft.

2. A powertrain including a continuously variable comprising:

an engine having an engine output shaft;

a vibration damper continuously connected with said engine output shaft;

a transmission input shaft continuously connected with said damper for co-rotation with said engine;

a transmission output shaft;

a continuously variable traction drive mechanism having an input member continuously drivingly connected with said transmission input shaft, and output member, and traction rollers frictionally drivingly connecting said input member and said output member;

a planetary gear arrangement having a sun gear member continuously connected with said output member, a planet carrier assembly member continuously connected with said transmission input shaft and including a plurality of pinion gear members rotatably mounted thereon, a forward ring gear member, and a reverse ring gear member, said sun gear member being drivingly connected with said ring gear members through said pinion gear members;

a selectively engageable synchronizer clutch mechanism having a first member continuously connected with said forward ring gear member, a second member continuously connected with said reverse ring gear member, and a synchronizer member selectively connectable with said first and second members; and a selectively engageable fluid operated friction clutch mechanism having a clutch input member continuously drivingly connected with said synchronizer member, a clutch output member continuously connected with said transmission output shaft, and a plurality of friction discs selectively interconnecting said clutch input and output members.

* * * * *